United States Patent [19]
Violette et al.

[11] Patent Number: 5,022,824
[45] Date of Patent: Jun. 11, 1991

[54] PINNED AIRFOIL PROPELLER BLADE

[75] Inventors: John A. Violette, Granby; Sean Auyeung, Windsor, both of Conn.

[73] Assignee: United Technologies Corporation, Hartford, Conn.

[21] Appl. No.: 255,099

[22] Filed: Oct. 7, 1988

[51] Int. Cl.⁵ ............................................. F01D 5/14
[52] U.S. Cl. .................................. 416/230; 416/248; 416/500
[58] Field of Search ............... 416/220 R, 221, 134 R, 416/140 R, 147, 205, 209, 226, 239, 270 R, 217, 224

[56] References Cited

U.S. PATENT DOCUMENTS

| | | | |
|---|---|---|---|
| 961,328 | 6/1910 | Wait | 416/220 R |
| 1,802,648 | 4/1931 | Heath | 416/134 R |
| 1,863,387 | 6/1932 | Woolson | 416/207 |
| 1,927,592 | 9/1933 | Lambert | 416/147 |
| 2,317,338 | 4/1943 | Rydmark | 416/221 |
| 2,537,739 | 1/1951 | Chilton | 416/134 R |
| 2,559,131 | 7/1951 | Oestrich et al. | 416/92 |
| 2,651,494 | 9/1953 | Persson | 416/220 R |
| 2,656,146 | 10/1953 | Sollinger | 416/97 R |
| 2,658,718 | 11/1953 | Walker | 416/92 |
| 2,873,088 | 2/1959 | Neumann | 416/194 |
| 2,936,155 | 5/1960 | Howell et al. | 416/134 R |
| 2,990,018 | 6/1961 | Moore | 416/131 X |
| 3,039,739 | 6/1962 | Leland | 416/222 |
| 3,487,879 | 1/1970 | McCarthy et al. | 416/220 |
| 3,572,970 | 3/1971 | Smuland | 416/221 |
| 3,860,361 | 1/1975 | McMurtry et al. | 416/120 |
| 3,870,434 | 3/1975 | Paulson | 416/147 X |
| 4,037,990 | 7/1977 | Harris | 416/220 |
| 4,047,840 | 9/1977 | Ravenhall et al. | 416/135 |
| 4,470,862 | 9/1984 | More et al. | 416/230 X |
| 4,626,169 | 12/1986 | Hsing et al. | 416/95 |
| 4,738,591 | 4/1988 | Butler | 416/160 X |
| 4,767,271 | 3/1988 | Catlow | 416/129 |
| 4,778,342 | 10/1988 | Conlow | 416/220 R |
| 4,784,575 | 11/1988 | Nelson et al. | 416/144 |
| 4,789,304 | 12/1988 | Gustafson et al. | 416/226 X |
| 4,810,167 | 3/1989 | Spoltman et al. | 416/230 X |

FOREIGN PATENT DOCUMENTS

| | | | |
|---|---|---|---|
| 1114820 | 9/1984 | U.S.S.R. | 416/131 |
| 113324 | 2/1918 | United Kingdom | 416/207 |
| 980656 | 1/1965 | United Kingdom . | |

OTHER PUBLICATIONS

Paper No. 66-WA/GT-4, Authors: J. I. Goatham and G. T. Smailes; "Some Vibration Characteristics of Pin-Fixed Compressor Blades", pp. 1 through 11. Contributed by the Gas Turbine Division, presented at Winter Annual Meeting, New York, N.Y., Nov. 27–Dec. 1, 1966.

Primary Examiner—John T. Kwon
Attorney, Agent, or Firm—Lloyd D. Doigan

[57] ABSTRACT

An essentially composite propeller or fan blade is provided which is rotatably mounted to a blade retention pitch member by a pin radially outside of a propeller spinner or hub. The blade has a plurality of composite layers wrapped directly around a root fairing which engages the pin. The propeller blade has a motion limiter provided at the base thereof which cooperates with the blade retention pitch member to damp rotational movement of the blade about the pin to minimize blade angular excursions when centrifugal loads are low, to moderate blade vibratory motion, to help tune out undesirable blade resonant frequencies and to transmit force created by impact with foreign objects to the pitch member. By cooperating with the pitch retention member, the root of the blade may be more aerodynamically shaped than other composite blades which must absorb the force of impact in their root portions.

15 Claims, 1 Drawing Sheet

U.S. Patent
June 11, 1991
5,022,824
FIG. 1
FIG. 2
FIG. 3
FIG. 4
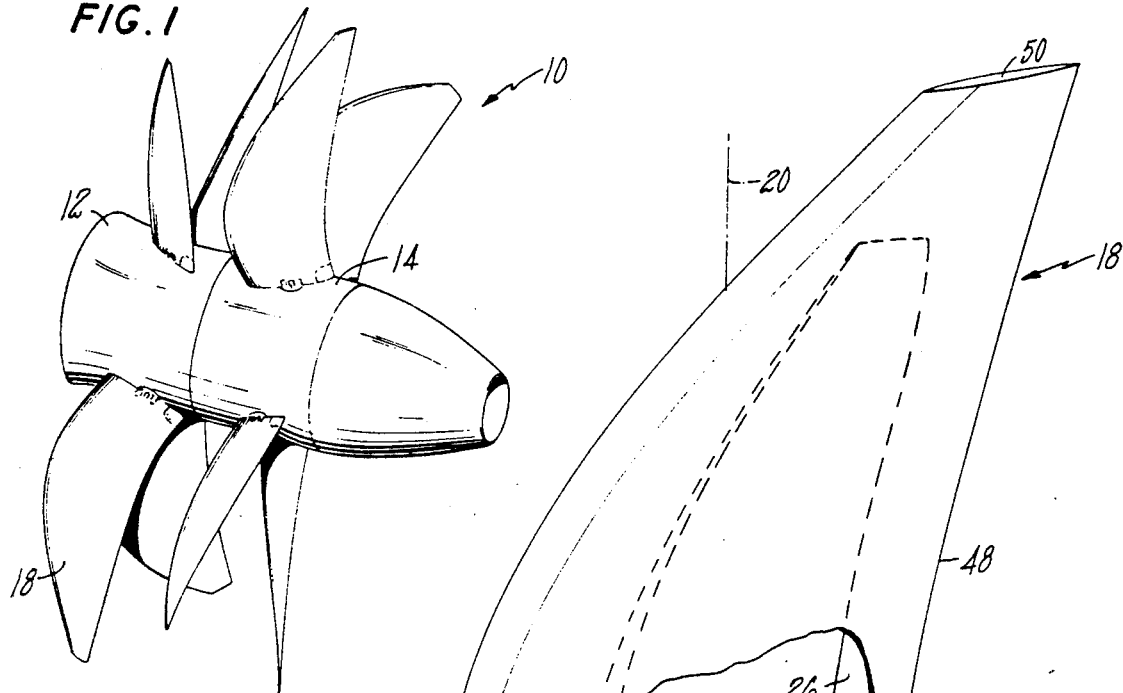
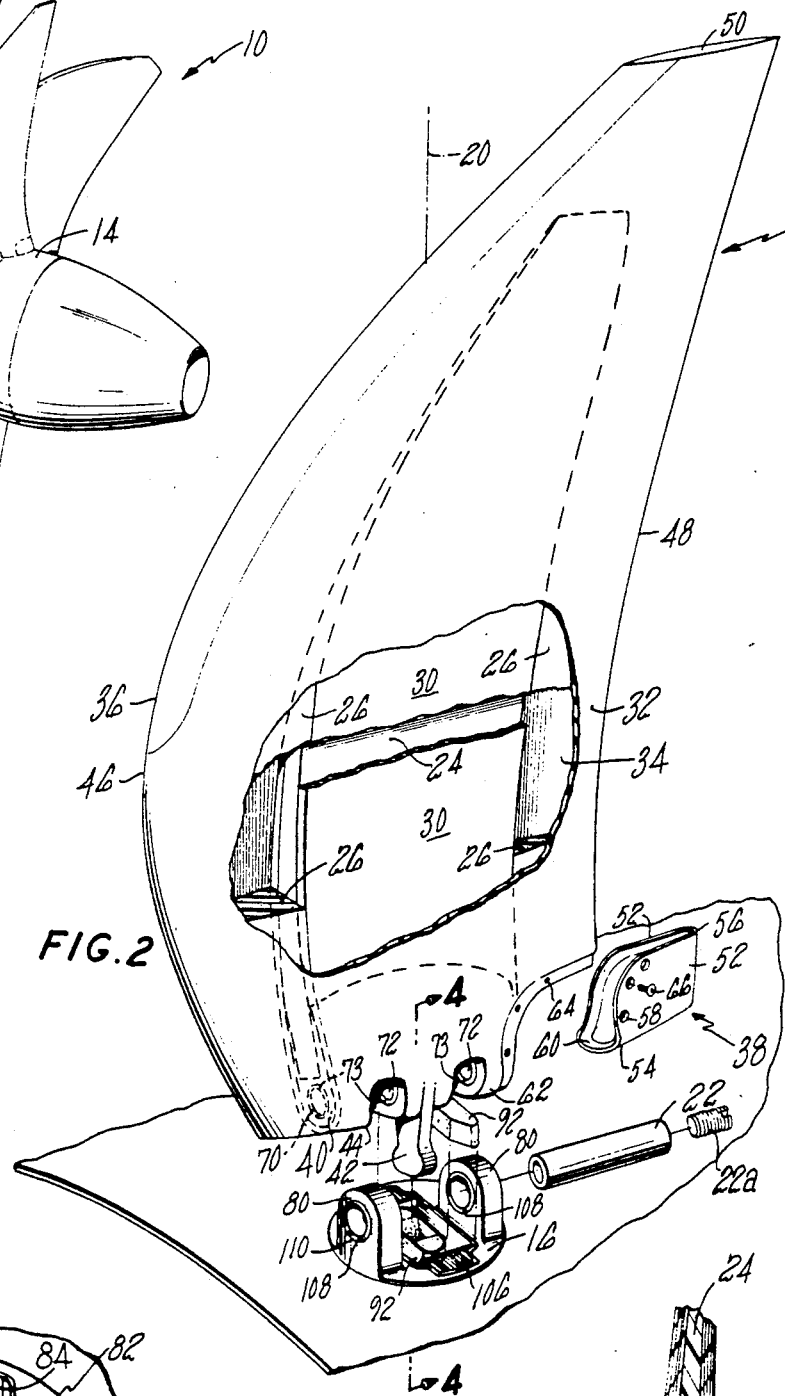
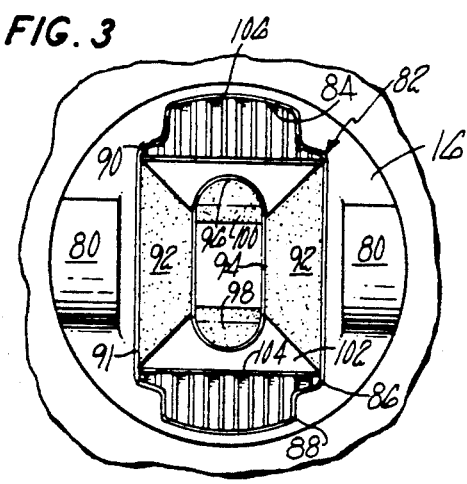
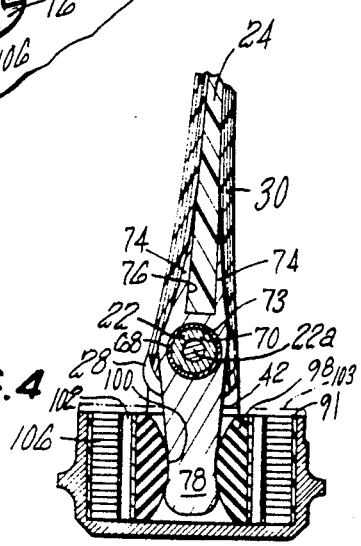

PINNED AIRFOIL PROPELLER BLADE

CROSS REFERENCE TO RELATED APPLICATIONS

This invention described herein may employ some of the teachings disclosed and claimed in commonly owned copending applications filed on even date herewith by Violette et al, (Ser. No. 07/255,815), entitled "Pinned Airfoil Propeller Assembly"; by Violette et al, (Ser. No. 07/225,815), entitled "Pitch Retention Member".

TECHNICAL FIELD

This invention relates to a propeller blade

BACKGROUND ART

Aircraft propeller blades are subject to damage from foreign objects such as sand, rain, hail, and birds etc. Propeller blades that are mounted towards the rear of an aircraft are particularly susceptible to foreign object damage. Runway debris, such as sand, runway markers, stones, ice, water, slush and segments of tire tread etc., may be kicked up into a plane of rotation of the blades. Collision between the foreign objects and the propeller blades may require the removal of the damaged blades from the propeller for repair.

Typically, propeller blades are mounted to a hub of a propeller by means of a blade retention member. The member is rotatable within the hub to allow the pitch of the propeller blade mounted therein to be set as required. A spinner may enclose the hub and the member.

To replace a damaged blade, the spinner and/or the blade retention member and/or the hub may have to be disassembled. Because of the complexity of the disassembly (and subsequent reassembly), blade changes are time consuming, expensive and subject to error. The problem is multiplied by propellers, such as counter-rotation prop fans, which have a plurality of blades.

In some counter-rotation prop-fans, one hub may hold as many as six to ten blades and the other hub may hold as many as six to twelve blades. Each blade is rather heavily loaded absorbing as much as 1000 horsepower of engine torque and developing as much as 1,500 pounds of engine thrust. Heavily loaded propeller blades are subject to high vibratory loads and stresses. Moreover because prop-fan blades are swept, they are subject to instability at higher speeds.

DISCLOSURE OF THE INVENTION

It is an object of the invention to provide a propeller blade which may be quickly and easily replaced.

It is a further object of the invention to increase the tolerance of a propeller blade to foreign object damage while providing an aerodynamic profile.

It is a further object of the invention to reduce blade vibratory retention loads and stresses.

It is a further object of the invention to provide a blade having improved high speed stability.

According to the invention, an essentially composite propeller blade is provided which may be mounted to a blade retention pitch member by means of a pin radially outside of a propeller spinner.

According to a feature of the invention, the essentially composite blade has a plurality of composite layers wrapped directly about around a root fairing which engages the pin thereby reducing and possibly eliminating the need for subsequent bonded or mechanical joints in the critical root area.

According to a further feature of the invention, the propeller blade has a motion limiter provided at the base thereof which is designed to cooperate with the blade retention pitch member to damp rotational movement of the blade about the pin, to minimize blade angular excursions when centrifugal loads are low, to moderate blade vibratory motion, to help tune out undesirable blade resonate frequencies, and to transmit force created by impact with foreign objects to the pitch member. By cooperating with the pitch retention member, the root of the blade may be more aerodynamically shaped than other composite blades which must absorb the force of impact in their root portions. The blade of the invention passes the force of such impact through its motion limiter to an outside means. By mounting the propeller blade for rotation about the axis of the pin, the blade response to a vibratory excitation in the first mode of vibration is modified such that the twisting motion of the blade is minimized. High speed stability of the blade is enhanced thereby.

These and other objects, features and advantages of the present invention will become more apparent in light of the following detailed description of a best mode embodiment thereof, as illustrated in the accompanying drawing.

BRIEF DESCRIPTION OF THE DRAWINGS

FIG. 1 shows a perspective view of a counter-rotating prop-fan propeller incorporating an embodiment of the invention;

FIG. 2 shows a perspective view, partially broken away, and partially exploded, of an embodiment of a propeller blade assembly of FIG. 1;

FIG. 3 shows a top view of a pitch retention member of FIG. 2; and

FIG. 4 shows a cut away view of the assembly of FIG. 2 taken along the line 4—4.

BEST MODE FOR CARRYING OUT THE INVENTION

Referring to FIG. 1, a counter-rotating prop-fan propeller 10 which provides an environment for an embodiment of the invention is shown. Such a propeller has a forward hub (not shown) covered by a first spinner 12, and an aft hub (not shown) covered by a second spinner 14. Each hub, as is known in the art, holds a rotatable blade pitch retention member 16 (see FIGS. 2 and 3). Each blade pitch retention member, in turn, has a blade 18 mounted thereto. Each blade may be rotated angularly about its longitudinal axis 20 by the blade pitch retention member to set the pitch of the blade as is well known in the art.

Referring to FIGS. 2 and 4, a best mode embodiment of the propeller blade of the invention is shown. The propeller blade is utilized in an assembly which has several major portions; the blade pitch retention member (hereinafter member) 16, the blade 18, and a retention pin 22.

The Blade

The blade 18 is comprised of: a spar formed of an insert 24, wrapping material 30 (see FIG. 4) and a spar root fairing 40 having an integral rotation limiter 42; a first filler material 26, a second filler material 28 (see FIG. 4), an airfoil shell having a first side 32 and a second side 34, a leading edge sheath 36, and a pin access panel 38. The blade has a root portion 44, a leading edge 46, a trailing edge 48 and a tip portion 50 as is well known in the art.

The insert 24, which forms the main load bearing structure of the spar is constructed of a graphite epoxy, Kevlar ®, or fiberglass composite material (or the like) and is shaped to approximate the internal geometry of both sides of the shell 32, 34 which, in turn, form final shape of the blade 18. The first filler material 26, which is a lightweight structural foam, provides structural integrity and shear strength to the leading and trail edge portions which overhang the spar. The second filler material 28, which is a pre-molded elastomeric material, is used to shape the root 40 as will be discussed infra. The spar wrapping material 30 is constructed of a pre-impregnated graphite tape, or the like. The first side 32 and the second side 34 of the shell are constructed of fiberglass cloth or the like, filled with transfer molded resins as are known in the art. The leading edge sheath 36, which is constructed of an electroformed nickel, protects the leading edge 46 of the blade from erosion and foreign object damage.

The pin access panel 38, which is located at the root portion 44 and trailing edge 48 of the blade 18, is shaped generally to conform with the shape of the root edge and trailing edge thereof. The pin access panel has two aerodynamic side portions 52, a bottom portion 54, and a trailing portion 56.

The pin access panel has two or more holes 58 passing therethrough to allow pin access panel to be secured to the first side 32 of the shell. The pin access panel has an inner contour 60 which cooperates with an outer contour 62 of the first side 32 and second side 34 of the shell to ensure an aerodynamic profile of the blade 18. The holes 58 align with an equal number of threaded holes 64 (or bushings or the like) disposed within the first side 32 of the shell. Screws 66 secure the pin access panel to the shell.

The spar root fairing 40 is comprised of a body 68 having a hollow core 70, a pair of mortise sections 72 extending into the body, a pair of side portions 74 which extend upwardly from the body, a cavity 76 formed between the side portions for receiving the insert 24 (see FIG. 4), and the rotation limiter 42 extending downwardly from the body. A bushing 73 is disposed within the length of the hollow core 70. The side portions 74 taper in width and in length upwardly from the body so that the side portions fair into the spar when the cavity receives the insert 24 (see FIGS. 2 and 4).

The rotation limiter 42 tapers in width downwardly from the body portion (see FIG. 4) and then extends outwardly to form a bulbous portion 78. The bulbous portion helps retain the rotation limiter within the member 16 as will be discussed infra.

The blade 18 is of common spar and shell construction. The spar, comprised of the insert 24, the wrapping material 30, and the root fairing 40, forms the primary structure of the blade. The first side 32 and the second side 34 of the shell extend beyond the boundaries of the spar to form the external airfoil. Cavities formed between the first and second sides of the shell are filled with the first filler material 26.

The spar is formed by first bonding the insert 24 to the spar root fairing 40 by means of an adhesive. The spar and root fairing are then used as a mandrel to wrap the wrapping material 30 therearound.

The second filler material 28 is appended to the wrapping material 30 conventionally by means of a silicone type adhesive. The second filler sections give the blade a profile at its root which prevents air from escaping between the root portion 44 of the blade and the spinner 12. The second filler shapes the root portion of the blade so that it fairs to the spinner 12 or 14 and so that it provides an aerodynamic shape in conjunction with the member 16, as will be discussed infra.

The spar and the first side 32 and second side 34 of the shell are bonded to each other along their mutual interface by means of an adhesive film. The insert is also bonded to the spar root fairing by means of a adhesive film.

The Member

The member 16 is conventionally mounted within the hub for rotation to set the pitch of the blades as is well known in the art.

The member has a pair of tenons 80 for insertion in the mortise sections 72 of the spar root fairing 40. The sides of the tenons cooperate with the second filler material and the wraps of the root portion of the blade to form an efficient aerodynamic shape. The tenons each have an opening 110 in which a bushing 108 is mounted. The member has an opening 82 in its center as seen in FIG. 3. The opening has four lobes 84, 86, 88, 90. A liner 91, which conforms to the shape of the opening, is slideably received within the lobes thereof.

Each of a pair of first elastomeric members 92 is bonded conventionally to the liner 91 within one of an opposing first pair of lobes 86, 90. Each elastomeric member is in turn conventionally bonded to an oblong, first metallic (or other deformable material) member 4. Bonded within each end 96 of the first metallic member is a second elastomeric member 98. As shown in FIG. 4, each second elastomeric member 98 has an arcuate cross-section 100. The arcuate cross-sections abut the bulbous end 78 of the rotation limiter 42.

A second metallic (or other deformable material) member 104 is attached to the liner 91 across each of lobes 84, 88. Bonded to the second metallic member and the liner 91 is a crushable material 106 such as a honeycomb. An air space 102 separates the first and second metallic members. The liner is slideably removable from its respective lobe for repair and replacement. The member may be enclosed by a removable cover 103 (shown in phantom in FIG. 4) which fairs into the spinner 12 or 14 to provide an aerodynamic profile at the root portion 44.

The Retention Pin

The retention pin 22 is formed of a hollow cylinder. The diameter of the cylinder conforms to the inner diameter of the bushings 73, 108. The retention pin has an threaded interior portion (not shown). The threaded interior portion is designed to engage a threaded key (e.g., a screw 22a) by which the pin may be withdrawn from the hollow core 70 of the fairing 40 and the openings 110 within the tenons 80.

Assembly

To construct the assembly, the rotation limiter 42 of the fairing 40 is inserted between the second elastomeric members 98 while the tenons 80 of the member 16 are inserted in mortise sections 72 of the fairing 40. When the holes 110 in the tenons align with the hollow core 70, the retention pin 22 is inserted therethrough. The holes 58 of the pin access panel 38 are aligned with the holes 64 in the first side of the shell. The pin access panel is then attached to the first side of the shell by screws 66.

If a blade is damaged and requires maintenance, the screws 66 holding the pin access panel 38 are removed so that access to the pin 22 is possible. The threads of the key (not shown) engage the pin. The pin is then removed by pulling the key. The blade may then be easily removed and replaced as above.

If a blade experiences impact from a foreign object, the impulsive energy of the impact will cause rotation of the blade about the pin. The impulsive energy is distributed through the rotation limiter across the second elastomeric members 98 in compression, across the first elastomeric members 92 in shear and across the first and second metallic members to the crushable material. The crushable material is designed to crush if a threshold bending moment that would damage the blade is distributed across the air space 102 thereto. Because the crushable material absorbs the force of the bending moment, the probability of damage to the blade is minimized. The second metallic member ensures that the force of the bending moment is evenly distributed across the crushable material. The liner makes it easier to slideably remove the crushable material mounted therein from its respective lobe.

In contrast to blades that may not rotate about a retention pin, rotation of the blade of the invention about the retention pin prevents the building of bending loads in the root portion of the composite portions of the spar thereby minimizing the probability of the fracture of relatively brittle composite portions. Blades that do not redistribute the bending moment caused by impacts must have root portions that are sized to withstand such bending moments. Such root portions become inordinately thick and are inefficient aerodynamically. Such inefficiency is particularly inappropriate in the prop fan environment where tip speeds of propeller blades may exceed Mach 1 and where flow between the blade root sections is accelerated due to a choking effect to speeds approaching Mach 1.

The composite insert and wraps provide several benefits. The finished blade is light weight. As a result, the pin 22 is able to reliably withstand the centrifugal loads placed thereon. A pin may not be able to withstand the loads of heavier blades. Also, the blades are strong enough to provide extended service and durability. Further, putting the pin in the blade allows the spar wrap material to overhang forward and aft of the retention tenons, thereby increasing the load capacity of the assembly.

The first and second elastomeric members resist the tendency of the blade to rotate about the pin in shear and compression as noted above. The durometer hardness and dimensions of the elastomeric used in the elastomeric members may be designed to tune out undesirable blade resonate frequencies, to reduce stress on the blade, and to minimize blade angular excursions when centrifugal loads are low.

The composite insert and wraps provide several benefits. The finished blade is light weight. As a result, the pin 22 is able to reliably withstand the centrifugal loads placed thereon. A pin may not be able to withstand the loads of heavier blades. Also, the blades are strong enough to provide extended service and durability. Because of the blades light weight and strength, the blade may be shaped aerodynamically as required.

The first mode of vibration in straight blades is characterized by a pure bending motion. Because of an overhanging tip mass, the first mode of vibration in swept blades is characterized by both a twisting motion and a bending motion The twisting motion acts to magnify blade response to vibratory excitations produced by the distortions of the aerodynamic flow field through the propeller thereby leading to high speed instabilities. By mounting the propeller blade for rotation about the axis of the pin, the blade response to the vibratory excitation in the first mode of vibration is modified such that the twisting motion of the blade is minimized. The first mode of vibration in the swept blade of the invention is characterized by a more pure bending motion than an equivalent fixed root blade. High speed stability is enhanced thereby. Blades that twist torsionally require stiffening to withstand such torsional twist. By utilizing a blade which may be mounted by a pin, thinner blades having shorter chord lengths may be utilized. Further the stability of the swept blade is improved with the blade being essentially free of flutter at blade tips speeds of about Mach 1.

Although the invention has been shown and described with respect to a best mode embodiment thereof, it should be understood by those skilled in the art that the foregoing and various other changes, omissions, and additions in the form and detail thereof maybe made therein without departing from the spirit and scope of the invention. For instance one of ordinary skill in the art would recognize the applicability of the invention to fan blades as well as propeller blades.

We claim:

1. A high speed airfoil blade comprising:
   a spar forming a main structural member of the said blade, said spar comprising:
   a root portion, said root portion having; means for allowing rotation of said blade about an axis passing through said blade in a chordwise direction, and
   a composite insert attaching to said root portion, said insert extending along a length of said blade, said insert forming a main load bearing structure of said spar; and,
   a shell covering said root portion and said insert of said spar, said shell forming an airfoil surface.

2. The blade of claim 1 further comprising;
   an elongated member extending downwardly from said root portion beyond said shell, said member being adapted to limit said rotation about said axis.

3. The blade of claim 1 wherein said means for allowing rotation comprises;
   a recess disposed within said root portion,
   an opening extending through said root portion along said axis, and
   a means extending through said opening and said recess for allowing said blade to rotate thereabouts.

4. The blade of claim 3 further comprising;
   a panel disposed within said shell to allow access to said means extending through said opening, said panel forming an airfoil surface.

5. The propeller or fan blade of claim 3 wherein said means extending through said opening comprises;
   a pin.

6. The blade of claim 5 wherein said pin further comprises;
   a hollow pin.

7. The blade of claim 6 wherein said hollow pin further comprises;
   a threaded interior portion for cooperating with a screw, said screw engaging said threaded interior portion so that said pin may be removed from said recess and said opening.

8. A high speed airfoil blade comprising:
a spar forming a main structural member of the said blade, said spar comprising;
   a root portion, said root portion having; means for allowing rotation of said blade about an axis passing through said blade in a chordwise direction,
   a composite insert having a first side and a second side and attaching to said root portion, said insert extending along a length of said blade and forming a main load bearing structure of said spar,
   a composite wrap attaching to said first side of said insert, wrapping about said root portion and attaching to said second side of said insert; and
a shell covering said root portion, said composite wrap, and said insert of said spar, said shell forming an airfoil surface.

9. The blade of claim 8 further comprising;
an elongated member extending downwardly from said root portion beyond said shell, said member being adapted to limit said rotation about said axis.

10. The blade of claim 8 wherein said means for allowing rotation comprises;
a recess disposed within said root portion,
an opening extending through said root portion along said axis, and
a means extending through said opening and said recess for allowing said blade to rotate thereabouts.

11. The blade of claim 10 further comprising;
a panel disposed within said shell to allow access to said means extending through said opening, said panel forming an airfoil surface.

12. The propeller or fan blade of claim 10 wherein said means extending through said opening comprises;
a pin.

13. The blade of claim 12 wherein said pin further comprises;
a hollow pin.

14. The blade of claim 13 wherein said hollow pin further comprises;
a threaded interior portion for cooperating with a screw, said screw engaging said threaded interior portion so that said pin may be removed from said recess and said opening.

15. A swept airfoil blade comprising:
a spar forming a main structural member of the said blade, said spar comprising;
   a root portion, said root portion having; means for allowing rotation of said blade about an axis passing through said blade in a chordwise direction for modifying a response of said blade to a vibratory excitation in a first mode of vibration such that a twisting motion of said blade is minimized, and
   a composite structural insert attaching to said root portion, said insert extending along a length of said blade and forming a main load bearing structure of said spar; and,
a shell covering said root portion and said insert of said spar, said shell forming an airfoil surface.

* * * * *

UNITED STATES PATENT AND TRADEMARK OFFICE
CERTIFICATE OF CORRECTION

PATENT NO. : 5,022,824

DATED : June 11, 1991

INVENTOR(S) : John A. Violette and Sean Auyeung

It is certified that error appears in the above-identified patent and that said Letters Patent is hereby corrected as shown below:

Column 1, line 12 "07/225,815" should be --07/255,100--

Column 4, line 32 "4" should be --94--

Signed and Sealed this

Sixth Day of April, 1993

Attest:

STEPHEN G. KUNIN

Attesting Officer

Acting Commissioner of Patents and Trademarks